June 29, 1926.
A. E. SCHEIN
1,590,778
GYROSCOPIC STABILIZER FOR SHIPS
Filed Sept. 28, 1920
2 Sheets-Sheet 2
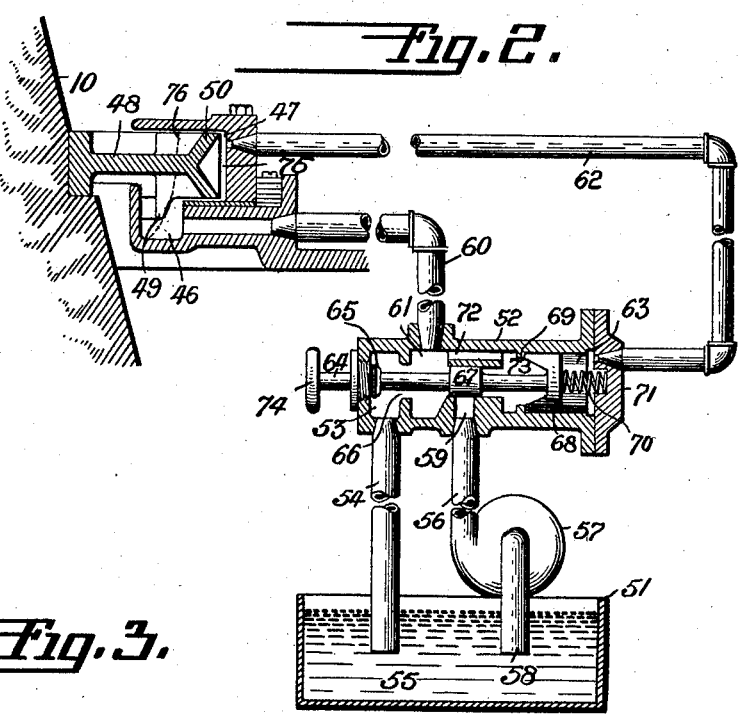
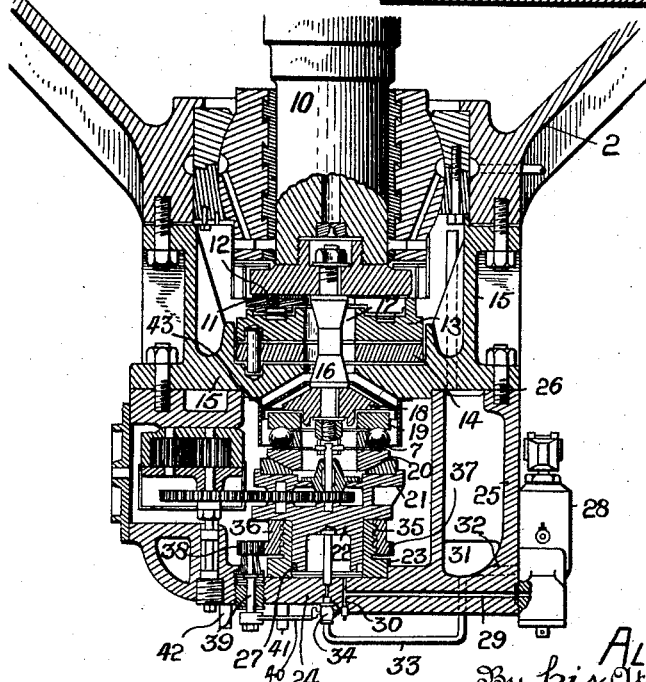
Inventor
ALEXANDER E. SCHEIN.
By his Attorney
Herbert H. Thompson Patented June 29, 1926.

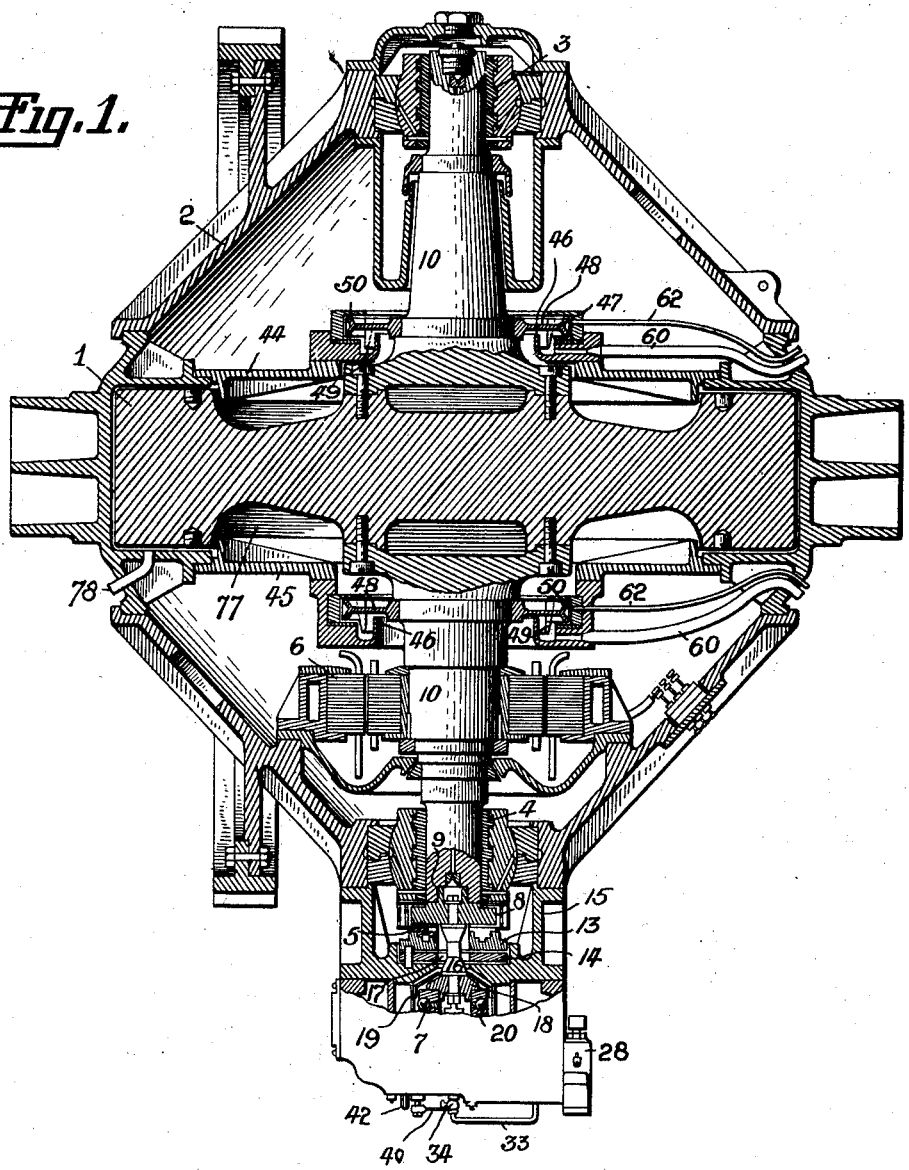

1,590,778

UNITED STATES PATENT OFFICE.

ALEXANDER E. SCHEIN, OF BROOKLYN, NEW YORK, ASSIGNOR TO THE SPERRY GYROSCOPE COMPANY, OF BROOKLYN, NEW YORK, A CORPORATION OF NEW YORK.

GYROSCOPIC STABILIZER FOR SHIPS.

Application filed September 28, 1920. Serial No. 413,414.

This invention relates to gyroscopic stabilizers for ships and more particularly to evacuated casings and to bearings for the rotor.

In gyroscopic stabilizers the usual practice is to encase the rotor and its driving motor in a casing within which a vacuum is created to eliminate air friction upon the rotor. Under this system the driving motor and the rotor bearings are also contained within the vacuum. This causes difficulty in cooling the motor and bearings and in lubricating the bearings.

One of the objects of this invention is to devise a method and means whereby the rotor may be enclosed in an evacuated casing without so enclosing the motor and bearings.

The invention further relates to an improved means and mechanism for maintaining a seal between a rotating element and its journal frame, so that a difference in atmospheric conditions may be maintained around the rotor, such as reduced pressure or an atmosphere of light gas or the like.

Referring to the drawings wherein I have shown what I now consider the preferred form of my invention:

Fig. 1 is a sectional side elevation of a gyroscopic rotor and casing showing the application of my invention.

Fig. 2 is an enlarged detail of the water gland or sealing device.

Fig. 3 is a sectional detail of the lower portion of the casing and rotor supporting bearings.

In the drawings, 1 represents the gyroscopic rotor and 2 the casing therefor having the usual gudgeons 2' adapted to support the gyroscope for oscillation about an axis at an angle to the spinning axis of the rotor. The rotor is shown mounted within said casing on upper and lower radial bearings 3, 4 and thrust bearing 5. The latter bearing may be of the oil film type which is capable of sustaining extremely high pressures. This type of bearing, however, offers considerable resistance to starting, owing to the fact that when at rest the oil is pressed out from between the bearing surfaces, and in fact the oil film between said surfaces is not established until a given speed of rotation is attained. In order then to facilitate the starting of the rotor so that it may readily be accomplished by the motor 6 provided to maintain the rotation of the rotor I have provided a non-friction bearing 7 which may carry the entire weight of the rotor during the starting period, the load being transferred to the heavier bearing after a predetermined speed has been attained.

The bearing 5 may be of the usual oil film bearing construction comprising an upper shoe or plate 8 secured at 9 to the lower end of the rotor shaft 10 and resting upon the bearing surfaces 11 of self adjusting blocks 12 which are pivotally mounted on a supporting member 13 which has a knife edge bearing (not shown) on a plate 14 in turn having a knife edge bearing (not shown) at right angles to the aforementioned knife edge bearing, on the end member 15 forming an integral part of the casing 2. As the details of this bearing do not form any part of this invention further details thereof will not be necessary.

Secured to plate 8 coaxial with shaft 10 is in extension shaft 16 which projects downwardly through central openings 17 in members 13 and 14 and is provided at its lower end with a plate 18 against which the upper race 19 of ball bearing 7 is adapted to rest. The lower race 20 of this bearing is carried by a member 21, the lower portion 22 of which forms a piston fitting into a cylinder 23 integral with and having its lower end closed by the end wall 24 of a cap 25 secured at 26 to member 15 and consequently to the casing 2. Piston rings or packing 27 may be provided on piston 22.

An oil pump 28 is shown attached to cap 25 and communicating through channels 29, 30 with the inside of cylinder 23. Said pump may receive oil from a reservoir 31 through channel 32. A pipe 33 provided with a valve 34 may run from the inside of cylinder 23 to the reservoir 31. The outside of cylinder 23 may be provided with screw threads 35 engaged by an internally threaded collar 36; said collar in turn being provided with gear teeth 37 meshing with a pinion 38 fixed on a shaft 39 reaching through and bearing in the end of cap 25. A lever 40 is fixed on said shaft and may be actuated between limit stops 41, 42.

As shown at 43 the upper race 19 of ball bearing 7 is normally disengaged from plate 18. Actuation of pump 28 will force oil into cylinder 23 and raise member 21, moving race 19 into engagement with plate 18. Continued actuation of said pump will raise the rotor 1 and disengage the bearing surfaces of the oil film bearing 5. The rotor will now be resting wholly on the non-friction ball bearing 7 ready for starting. While pump 28 is being actuated lever 40 may be readily turned, since the weight is at that time removed from the threads, thereby causing collar 36 to follow the upward movement of member 21. When lever 40 reaches stop 42 the rotor will have been raised to the proper position. Said lever will thus serve to indicate that the rotor is riding on the ball bearing and entirely free from the friction bearing. Conversely, when lever 40 engages stop 41 it will serve to indicate that the rotor is resting on the oil film bearing and free from the ball bearing. Another important function of collar 36 is to support member 21 in the raised position to prevent lowering of the rotor in the event of leakage of oil from cylinder 23.

When the rotor has attained a speed sufficient to cause proper functioning of bearing 5, the bearing 7 may be lowered to its inoperative position and the rotor will rest on bearing 5. To lower the rotor a stroke of pump 28 may be necessary to ease collar 36 from the pressure of member 21. Lever 40 may then be thrown around to stop 41, rotating collar 36 on threads 35 and lowering it to its inoperative position. Valve 34 may then be turned to permit the oil in cylinder 23 to flow back into reservoir 31. Obviously, the passage through valve 34 may be sufficiently small to cause a slow transfer of the oil so that the raised elements will not be permitted to drop suddenly to their lower positions. The above described specific form of thrust bearing is not claimed herein, however, but is reserved for my copending application No. 43,462 for improvements in thrust bearings, filed July 14, 1925.

The casing 2 is shown as having inner walls 44, 45 reaching inwardly close to the sides of the rotor 1 toward the shaft 10 thereof. Said walls are each provided with a vertical and a horizontal groove or channel 46, 47 (see also Fig. 2) encircling shaft 10 and slightly displaced therefrom. Fixed on the shaft is a circumferential member 48 reaching into channel 47 at 50 and having downward projections 49 reaching into channel 46. At a suitable point without the casing 2 may be positioned a water or other fluid supply tank 51 and a control valve 52. One chamber 53 of said valve may be connected by a pipe 54 to the water 55 in said tank, while a second pipe 56 having a pump 57 associated therewith may communicate with the water at 58 and the valve at 59. A suitable conduit 60 may connect chamber 61 of the valve with channel 46 while a similar conduit 62 may connect chamber 63 of the valve with channel 47. The control valve 52 is provided with a stem 64 carrying a valve head 65 adapted to close the passage 66 between chambers 53 and 61; a piston valve 67 closing communication between pipe 56 and the interior of the valve, and a piston head 68 held in the position shown against stop 69 by a spring 70 pressing against said cylinder and the end 71 of the valve casing. A passage 72 is shown permitting water from chamber 61 to flow into chamber 73. After the rotor has been started and has attained a predetermined speed knob 74 of valve 52 may be pressed in to close the opening 66 and uncover the opening 59. Pump 57 being adapted to supply water at a predetermined pressure will cause the water to rise through conduit 60 and flow into channel 46. The water in the valve will pass through passage 72 into chamber 73 so that the pressure on the opposite ends of stopper 67 will be equalized, while the pressure against valve head from within chamber 61 will be less than that against piston 68 from within chamber 73 by reason of the difference in area of these two elements, so that the water pressure will serve to hold the valve stem 64 and integral parts in the inwardly pressed position even against the pressure of spring 70, the strength of which is not sufficient to overcome the said difference in water pressure. Thus when knob 74 has been pressed in and released the parts will remain in this position. When the water flowing into channel 46 reaches the projections 49 on member or impeller 48 it will be carried around in said channel by reason of the rotation of the rotor 1 and thrown by centrifugal force against the outer wall of channel 46 and the rear wall 75 of channel 47 and continued in motion in channel 47 by the portion 50 of the impeller. In the meanwhile water may continue to flow into the channels 46, 47 until it reaches a predetermined point represented by dotted line 76, at which point the pressure acting through conduit 62 and in chamber 63 of valve 52 due to the centrifugal force of the water in channel 47 is designed to overcome the pressure on the rear side of piston 68 and force stem 64 back to normal position, as shown, closing pipe 56 and opening passage 66. In the meanwhile it will be seen that the water in channels 46, 47 will have tightly sealed the rotor within the inner compartment 77 of casing 2 and preferably before valve 52 is restored to normal condition the air should be withdrawn from compartment 77 through tube 78 by any suitable apparatus so as to create a vacuum within said compartment.

After the vacuum has been established and valve 52 restored to its normal condition in the manner set forth, communication between tank 51 and channel 46 will have become established through pipe 54, chambers 53, 61 of the valve and conduit 60. The vacuum in the rotor chamber 77 will now tend to suck in the water from the channels 46, 47 or in other words, atmospheric pressure from without will tend to force the said water into the vacuum chamber, while atmospheric pressure will also tend to force water from tank 51 into channel 46. Both of these tendencies will be counteracted, however, by centrifugal force acting upon the water in the channels.

Obviously the water in the channels will in time decrease by evaporation or other causes so that the consequent decreased centrifugal force acting through conduit 60 will be overcome by the atmospheric pressure acting upon the water 55, and water will be forced from tank 51 into channel 46 until the balance is again established. Thus the sealing water gland in channels 46, 47 will be automatically maintained.

When it is desired to stop the rotor the vacuum in chamber 77 may be broken before the speed of the rotor becomes too low, so that the water in the channels will run back into tank 51.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination with a rotatable element and a casing therefor, the operating pressure therein being normally less than atmospheric pressure, of a circumferentially grooved member on said casing, an annular projection carried by said element and entering said grooved member, and means for supplying liquid to said member at less than atmospheric pressure, the amount of liquid flowing into said member being governed by the balance between the negative pressure within the casing and the pressure created by the centrifugal force of the rotating liquid.

2. In combination, a rotatable element, a casing enclosing said element, a circumferential grooved member on said casing, a circumferential member on said element reaching into said grooved member, means for supplying liquid to said grooved member in starting, means responsive to the centrifugal pressure of liquid in said grooved member for rendering said liquid supply means ineffective, and additional means for supplying liquid to said grooved member during normal operation adapted to become operative when said first supply means becomes ineffective.

3. In combination, a rotatable element, a casing therefor, said casing being provided with a channel, a projection on said element movable in said channel, means for supplying liquid under pressure to said channel, additional means connecting said channel with a liquid source, means controlled by the volume of liquid in said channel for closing said first named means and opening said second named means.

4. In combination, a casing normally operating at less than atmospheric pressure, an opening into said casing, a rotatable element reaching through said opening, means for sealing said opening including a grooved portion associated with said casing surrounding said element, a circumferential projection on said element reaching into said grooved portion, means for supplying liquid under pressure to said portion, means for shutting off said liquid supply in response to the pressure of the liquid in the groove and for connecting the groove to a liquid source under less head than the static head on the liquid in said grooved portion.

5. A liquid seal for the casings of rotors operating under less than atmospheric pressure comprising a member rotatable with the rotor, a stationary grooved member on said casing and receiving said rotatable member, and a liquid supply tank at less head than said members for normally supplying said members with liquid.

6. In combination, an element rotatable on a normally vertical axis, a casing enclosing said element and provided with a circumferential groove adapted to contain liquid to the second annular channel in said casing of less radius than said groove and under the same, a circumferential projection on said element reaching into said groove for impelling liquid in the groove, said projection being provided with a flaring and slanting portion to cause the liquid to be forced with greater pressure against the walls of said groove, and blades on said projection extending into said channel for increasing the rate of rotation of the liquid.

7. In combination, a rotatable element, an evacuated casing therefor, a liquid seal between said casing and said element, means for supplying liquid to said seal, means controlled by the centrifugal pressure of the liquid in said seal for shutting off said supply means and additional means for supplying liquid to said seal adapted to become operative when said first supply means becomes ineffective.

8. In combination, a rotatable element, an evacuated casing therefor, a liquid seal between said casing and said element, means for supplying liquid to said seal under pressure, a source of liquid under less static head than the liquid in said seal, and means for shutting off said pressure supply in response to the centrifugal pressure of the liquid in the seal and for connecting the seal to said second source of liquid.

In testimony whereof I have affixed my signature.

ALEXANDER E. SCHEIN.